(12) United States Patent
Vargas et al.

(10) Patent No.: US 11,989,506 B2
(45) Date of Patent: May 21, 2024

(54) SYSTEMS FOR DATABASE SEARCHING AND DATABASE SCHEMAS MANAGEMENT AND METHODS OF USE THEREOF

(71) Applicant: Capital One Services, LLC, McLean, VA (US)

(72) Inventors: Cruz Vargas, Ocean Springs, MS (US); Phoebe Atkins, Midlothian, VA (US); Alexander Lin, Arlington, VA (US); Joshua Edwards, Philadelphia, PA (US); Lin Ni Lisa Cheng, New York, NY (US); Rajko Ilincic, Annandale, VA (US); Max Miracolo, Brooklyn, NY (US); Brian McClanahan, Hyattsville, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/874,855

(22) Filed: Jul. 27, 2022

(65) Prior Publication Data
US 2024/0037326 A1  Feb. 1, 2024

(51) Int. Cl.
*G06F 16/30* (2019.01)
*G06F 16/33* (2019.01)
(Continued)

(52) U.S. Cl.
CPC ........ *G06F 40/194* (2020.01); *G06F 16/3347* (2019.01); *G06F 16/338* (2019.01); *G06F 40/284* (2020.01)

(58) Field of Classification Search
CPC .. G06F 40/194; G06F 40/284; G06F 16/3347; G06F 16/338
See application file for complete search history.

(56) References Cited

U.S. PATENT DOCUMENTS

| | | | |
|---|---|---|---|
| 9,430,563 | B2 | 8/2016 | Clinchant et al. |
| 10,740,406 | B2 | 8/2020 | Koutrika et al. |

(Continued)

OTHER PUBLICATIONS

Article entitled "Document Level Embeddings for Identifying Similar Legal Cases and Laws (AILA 2020 shared Task")", by Almuslim et al., dated Dec. 20, 2020 (Year: 2020).*

(Continued)

*Primary Examiner* — Mahesh H Dwivedi
(74) *Attorney, Agent, or Firm* — Greenberg Traurig, LLP

(57) ABSTRACT

Systems and methods of the present disclosure enable database search. The systems and/or methods may include receiving a search query that includes an input document having text. Word embeddings are generated within the input document, where the word embeddings include vector representations of words in the text of the input document. An average input document word embedding vector is determined for the word embeddings of the input document. A set of stored documents is accessed, where each stored document includes a stored text has a particular average stored document word embedding vector. A similarity model is used to determine a similarity metric measuring the similarity between the input document and each stored document based on the average input document word embedding vector and the particular average stored document word embedding vector of each stored document.

20 Claims, 10 Drawing Sheets

(51) Int. Cl.
*G06F 16/338* (2019.01)
*G06F 40/194* (2020.01)
*G06F 40/284* (2020.01)

(56) References Cited

U.S. PATENT DOCUMENTS

| | | | |
|---|---|---|---|
| 2004/0088157 | A1 | 5/2004 | Lach et al. |
| 2007/0150443 | A1 | 6/2007 | Bergholz et al. |
| 2013/0041857 | A1* | 2/2013 | Medlock ............... G06F 40/274 706/14 |
| 2014/0280184 | A1* | 9/2014 | Swaminathan ..... G06F 16/2228 707/741 |
| 2015/0220833 | A1* | 8/2015 | Le ........................... G06N 3/04 706/16 |
| 2018/0018564 | A1* | 1/2018 | Erenrich ............. G06F 16/3334 |
| 2018/0357216 | A1* | 12/2018 | Bakis ..................... G06F 40/10 |
| 2019/0138615 | A1* | 5/2019 | Huh ...................... G06F 16/953 |
| 2020/0293873 | A1* | 9/2020 | Dai ....................... G06F 40/279 |
| 2021/0182479 | A1* | 6/2021 | Kim ...................... G06F 40/194 |
| 2022/0044148 | A1* | 2/2022 | Härmä .................. G06N 20/00 |
| 2023/0244990 | A1* | 8/2023 | Jacobs ............... G06F 11/3409 706/55 |

OTHER PUBLICATIONS

Article entitled "Research on Text Representation Method Based on Improved TF-IDF", by Fu et al., dated 2020 (Year: 2020).*
Article entitled "Intelligent Multi-Language Plagiarism Detection System", by Al-Bayed et al., dated Mar. 2018 (Year: 2018).*
Article entitled "Task-Oriented Word Embedding for Text Classification", by Liu et al., dated Aug. 26, 2018 (Year: 2018).*

* cited by examiner

SYSTEMS FOR DATABASE SEARCHING AND DATABASE SCHEMAS MANAGEMENT AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based platforms and/or systems for database searching and database management, and in particular searching a database based on semantics of content of an input document.

BACKGROUND OF TECHNOLOGY

Typically, identifying documents may be needed in a wide range of applications. Thus, without limitation, searching for documents in a database may be a typical computer-based problem to solve. The so-called "traditional" search engine implementations may rely on methods such as key word search and term frequency inverse document frequency weighting to identify documents in response to a search query.

SUMMARY OF DESCRIBED SUBJECT MATTER

Embodiments of the present disclosure include one or more methods for database search and database schema management. The method(s) include: receiving, by at least one processor, a search query from a computing device associated with a user; where the search query includes an input document having text; generating, by the at least one processor, a plurality of word embeddings within the input document; where the plurality of word embeddings include a plurality of vector representations of a plurality of words in the text of the input document; determining, by the at least one processor, an average input document word embedding vector for the plurality of word embeddings for the input document; accessing, by the at least one processor, a set of stored documents; where each stored document in the set of stored documents includes a stored text; where each stored document in the set of stored documents having a particular average stored document word embedding vector; utilizing, by the at least one processor, a similarity model to determine a similarity metric of a similarity between the input document and each stored document in the set of stored documents based at least in part on the average input document word embedding vector and the particular average stored document word embedding vector; generating, by the at least one processor, a ranked list of stored documents in the set of stored documents based at least in part on the similarity metric associated with each stored document; and instructing, by the at least one processor, the computing device to display the ranked list of stored documents in response to the search query.

Embodiments of the present disclosure include one or more systems for database search and database schema management. The system(s) include at least one processor. The at least one processor is configured to execute software instructions that cause the at least one processor to perform steps to: receive a search query from a computing device associated with a user; where the search query includes an input document having text; generate a plurality of word embeddings for the input document; where the plurality of word embeddings include vector representations of a plurality of words in the text of the input document; determine an average input document work embedding vector for the plurality of word embeddings for the input document; access a set of stored documents; where each stored document in the set of stored documents includes a stored text; where each stored document in the set of stored documents having a particular stored document average word embedding vector; utilize a similarity model to determine a similarity metric of a similarity between the input document and each stored document in the set of stored documents based at least in part on the average input document word embedding vector and the particular average stored document word embedding vector; generate a ranked list of stored documents in the set of stored documents based at least in part on the similarity metric associated with each stored document; and instruct the computing device to display the ranked list of stored documents in response to the search query.

Embodiments of the system(s) and/or method(s) may further include where the similarity model includes a cosine similarity determination.

Embodiments of the system(s) and/or method(s) may further include: utilizing, by the at least one processor, a word vectorization model to generate the plurality of word embeddings for the input document; receiving, by the at least one processor, a user selection confirming or denying the similarity metric of at least one stored document in the ranked list of stored documents; determining, by the at least one processor, a similarity error based at least in part on a difference according to an optimization function between: i) the user selection confirming or denying the similarity metric of the at least one stored document in the ranked list of stored documents, and ii) a ranked position of the at least one stored document within the ranked list of the stored documents; and training, by the at least one processor, parameters of the word vectorization model based at least in part on the similarity error.

Embodiments of the system(s) and/or method(s) may further include: receiving, by the at least one processor, a user selection confirming or denying the similarity metric of at least one stored document in the ranked list of stored documents; determining, by the at least one processor, a similarity error based at least in part on a difference according to an optimization function between: i) the user selection confirming or denying the similarity metric of the at least one stored document in the ranked list of stored documents, and ii) a ranked position of the at least one stored document within the ranked list of the stored documents; and training, by the at least one processor, parameters of the similarity model based at least in part on the similarity error.

Embodiments of the system(s) and/or method(s) may further include where the similarity model includes an optimization objective to maximize the similarity metric between the input document and the set of stored documents.

Embodiments of the system(s) and/or method(s) may further include where the similarity model includes at least one clustering model.

Embodiments of the system(s) and/or method(s) may further include generating, by the at least one processor, a k-d tree of the set of stored documents; and determining, by the at least one processor, the ranked list of stored documents by using the similarity model to traverse the k-d tree.

Embodiments of the system(s) and/or method(s) may further include: receiving, by at least one processor, a new document having new text; generating, by the at least one processor, a plurality of new word embeddings for the new document; determining, by the at least one processor, a new average word embedding vector of the plurality of new word embeddings for the new document; and storing, by the at least one processor, the new document in the set of stored documents; where storing the new document in the set of stored documents includes adding the new average word embedding vector to a cache of the stored average word embedding associated with the stored text of each stored document.

Embodiments of the system(s) and/or method(s) may further include where the average of the plurality of word embeddings includes a weighted average based at least in part on a section of the text in which each word is located.

Embodiments of the system(s) and/or method(s) may further include generating, by the at least one processor, a similarity alert based at least in part on the similarity metric of the input document to at least one stored document in the set of stored documents exceeding a predetermined similarity threshold; and causing, by the at least one processor, the computing device to produce the similarity alert to the user to alert the user of the at least one stored document.

Embodiments of the system(s) and/or method(s) may further include where the input document includes a regulatory requirement document, and the set of stored documents includes a set of business controls documents.

Embodiments of the system(s) and/or method(s) may further include instructing at least one activity execution device, by the at least one processor, to execute at least one activity associated with the input document according to the highest ranked stored document in the ranked list of stored documents.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
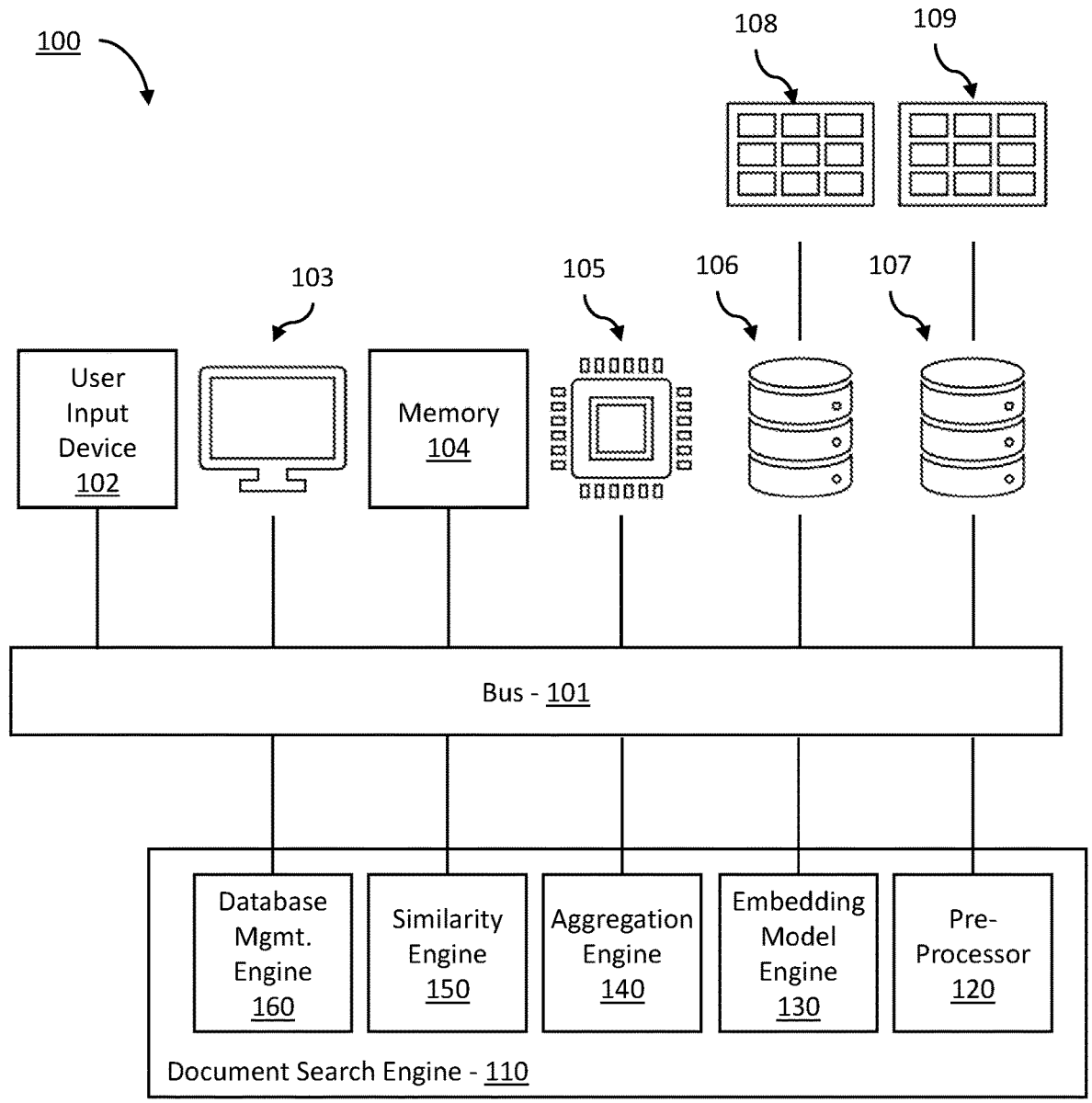
FIG. 1 is a block diagram of another illustrative computer-based system for document search in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

Accordingly, FIGS. 1 through 8 illustrate systems and methods of database management and database searching for an improved, more efficient, database schema. The following embodiments provide technical solutions and technical improvements that overcome technical problems, drawbacks or deficiencies in the technical fields involving efficiently mapping documents in a database schema. As explained in more detail below, technical solutions and technical improvements may include, without limitations, aspects of improved document and/or files search for more efficient document/file classification, mapping, and database management in accordance with at least some embodiments. For example, based on such technical features, further technical benefits may become available to users and operators of these systems and methods. Moreover, various practical applications of the disclosed technology are also described, which provide further practical benefits to users and operators that are also new and useful improvements in the art.

For example, in some embodiments, identifying documents may be needed in a wide range of applications. For example, in financial products, risk assessment requires making sure that controls are in place to satisfy the ever growing regulatory requirements set forth by various regulatory agencies and policies such as the Federal Financial Institutions Examination Council, Payment Card Industry, Financial Industry Regulatory Authority, Office of the Comptroller of Currency, and numerous others. To find more efficiently (e.g., quickly, less computing resource power, etc.) existing documents that can be used to satisfy new or existing needs, systems and methods of the present disclosure employ a search engine based system. The system/method allows users to enter the raw text of an input document and returns existing stored documents which may be relevant. Unlike so-called "traditional" search engine implementations which may rely heavily on methods such as key word search and term frequency inverse document frequency weighting, at least some embodiments of the present disclosure may use similarity metrics based on vector space representations of words called word embeddings. Word embeddings can be produced by a class of models known as semantic vector space models and include algorithms such as Word2Vec, Glove, Latent Semantic Analysis, and more. These models produce embeddings that place semantically similar words close to one another within a vector space. The degree of semantic similarity between a pair of words can then be measured by the distance between their embeddings. Embodiments of the present disclosure may leverage this property of vector space models as the basis for a document search model. Analyzing the distance between normalized averaged word embeddings allows for the identification of relevant documents to an input document.

Most vector space models produce embeddings in an unsupervised fashion using syntactical relationships between words as they occur in some corpus of text. However, for the document mapping problem there may be existing document-to-document mappings defined which makes it possible to learn embeddings in a supervised way that more accurately identifies valid document pairs. For both documents in a pair, a single embedding is produced by averaging over the embeddings of all the words in each document or performing any other suitable statistical aggregation. A similarity measure, such as cosine similarity or other suitable similarity measure, is then used to determine the compatibility of the documents in a pair. The underlying word embeddings are learned in a way such that the similarity measure is higher for cases where an input document can be associated with a stored and lower for the cases where it cannot. Given a requirement all potentially relevant stored documents can be ranked based on similarity. This system significantly outperforms a baseline enterprise search solution Elasticsearch based on a top ten accuracy metric.

FIG. 1 is a block diagram of another illustrative computer-based system for document search in accordance with one or more embodiments of the present disclosure.

In some embodiments, an illustrative document search system 100 includes a computing system having multiple components interconnect through, e.g., a communication bus 101 to implement a document search engine 110 for searching stored documents 109 with an input document 108 of a search query. In some embodiments, the communication bus 101 may be a physical interface for interconnecting the various components, however in some embodiments, the communication bus 101 may be a network interface, router, switch, or other communication interface. The document search system 100 may receive input document 108 and stored documents 109, and the various components may interoperate to map the input document 108 according to more efficient searching and mapping to the stored documents 109 in a stored document database 107.

In some embodiments, the document search system 100 may include a processor 105, such as, e.g., a complex instruction set (CISC) processor such as an x86 compatible processor, or a reduced instruction set (RISC) processor such as an ARM, RISC-V or other instruction set compatible processor, or any other suitable processor including graphical processors, field programmable gate arrays (FPGA), neural processors, etc.

In some embodiments, the processor 105 may be configured to perform instructions provided via the bus 101 by, e.g., accessing data stored in a memory 104 via the communication bus 101. In some embodiments, the memory 104 may include a non-volatile storage device, such as, e.g., a magnetic disk hard drive, a solid-state drive, flash memory, or other non-volatile memory and combinations thereof, a volatile memory such as, e.g., random access memory (RAM) including dynamic RAM or static RAM, among other volatile memory devices and combinations thereof. In some embodiments, the memory 104 may store data resulting from processing operations, a cache or buffer of data to be used for processing operations, operation logs, error logs, security reports, among other data related to the operation of the document search system 100.

In some embodiments, a user or administrator may interact with the document search system 100 via a display 103 and a user input device 102. In some embodiments, the user input device 102 may include, e.g., a mouse, a keyboard, a touch panel of the display 103, motion tracking or detecting, a microphone, an imaging device such as a digital camera, among other input devices. Results and statuses related to the document search system 100 and operation thereof may be displayed to the user via the display 103. In some embodiments, the user may provide a search query to the document search system 100, the search query including the input document 108 to, e.g., map the input document 108 to a particular document and/or content type of the stored documents 109. Thus, the search query may trigger the document search engine 110 to search the stored documents 109 based on the input document 108.

In some embodiments, a stored document database 107 may communicate with the document search system 100 via, e.g., the communication bus 101 to provide the input document 108. In some embodiments, the term "document" may refer to any file having computer and/or human readable contents. The document may include a word processor document (e.g., .doc, .docx, .dot, .dotm, .dotx, .html, .odf, .odt, .ott, .pages, .pdf, .pub, .rtf, .sdw, .sxw, .wpd, .wps, .wri, .txt, etc.), spreadsheet document (e.g., .csv, .numbers, .ods, .pdf, .sdc, .sxc, .xls, .xlsm, .xlsx, .xml, etc.), presentation document (e.g., .key, .keynote, .pdf, .pot, .potx, .ppsx, .ppt, .pptm, .pptx, .sdd, .vsd, .vsdx, etc.), network document (e.g., html, css, Javascript, etc.), programming script, source code, binary code, among other documents and/or document file types or any suitable combination thereof.

In some embodiments, an input document database 106 may communicate the search query to the document search engine 110 to search the stored documents 109 in the stored document database 107 via, e.g., the communication bus 101. In some embodiments, the stored documents 109 may include any suitable input documents for which the input document 108 may be mapped. In some embodiments, the stored documents 109 may include, e.g., product descriptions, literary works, software programming source code and/or scripts, web page documents, regulatory stored documents, regulatory requirements documents, standard operation procedures, manuals, among other types of document content or any combination thereof. In some embodiments, the input document 108 may include a document having document content that is to be mapped to a particular document and/or content type of the stored documents 109. Accordingly, in some embodiments, the document search engine 110 may use the contents of the input document 108 to search the stored documents 109 in the stored document database 107 to identify the input documents and/or document content type associated with the input document 108 based on the contents of each input document.

In some embodiments, a pre-processor 120 receives the input document 108 and the stored documents 109. In some embodiments, the pre-processor 120 may include, e.g., a memory having instructions stored thereon, as well as, e.g., a buffer to load data and instructions for processing, a communication interface, a controller, among other hardware. A combination of software or hardware may then be implemented by the pre-processor 120 in conjunction with the processor 105 or a processor dedicated to the pre-processor 120 to implement the instructions stored in the memory of the pre-processor 120.

In some embodiments, the input document 108 and the stored documents 109 include raw data from the collection of documents. As such, the contents of the input document 108 and the stored documents 109 may include, e.g., a variety of formats, varying formatting (e.g., stylistic and/or data formatting), structured data, unstructured data, duplicate data, typographical errors, among other data variances. Thus, to facilitate processing and using the data for consistent and accurate results, the data may be pre-processed to remove inconsistencies, anomalies, and variances. Thus, in some embodiments, the pre-processor 120 may ingest, aggregate, and cleanse, among other pre-processing steps and combinations thereof, the data items from each of the input document 108 and the stored documents 109.

Using the pre-processor 120, the input document 108 may be converted to plain text, may separate content and formatting information, may remove stylistic formatting features (e.g., page breaks, tabs, columns, etc.), as well as perform other transformations or any combination thereof. Similarly, the pre-processor 120, the stored documents 109 may be converted to plain text, may separate content and formatting information, may remove stylistic formatting features (e.g., page breaks, tabs, columns, etc.), as well as perform other transformations or any combination thereof. As a result, the pre-processor 120 may transform each document to have consistent formatting of the style and/or data structure of the contents of each document.

In some embodiments, the pre-processor 120 may tokenize the content of each document. In some embodiments, tokenization may include generating a set of tokens representing the content of the document, where each token represents a unit of data, such as, e.g., a character, a sub-word, a word, a phrase, or other suitable token. Accordingly, in some embodiments, tokenization may include one or more techniques for breaking the content of the document up into the tokens representing the content. The technique(s) may include, e.g., delimiting by period, comma, semi-colon, colon, space or other punction or any combination thereof, byte pair encoding (BPE), dictionary-based tokenization, among other tokenization techniques or any combination thereof.

In some embodiments, the pre-processed input documents and the pre-processed stored documents may be stored in, e.g., a database or a storage, such as, e.g., the input document database 106 and the stored document database 107, respectively, the memory 104, or a local storage of the pre-processor 120, or any other suitable data warehouse or any combination thereof.

In some embodiments, an embedding model engine 130 accesses the pre-processed input document 108 and the pre-processed stored documents 109. In some embodiments, the embedding model engine 130 may include, e.g., a memory having instructions stored thereon, as well as, e.g., a buffer to load data and instructions for processing, a communication interface, a controller, among other hardware. A combination of software and hardware may then be implemented by the embedding model engine 130 in conjunction with the processor 105 or a processor dedicated to the embedding model engine 130 to implement the instructions stored in the memory of the embedding model engine 130.

Searching the stored documents 109 via, e.g., keywords and/or key phrases, or other types of searches are inefficient and inaccurate because such searches fail to identify semantics, concepts, intent, etc. Thus, in response to the search query, the document search system 100 may instantiate an embedding model engine 130 to embed the content of each document in vectorized form to encode, e.g., semantics, subjects, topics, concepts, intent, etc.

In some embodiments, the embedding model engine 130 may include a machine learning model trained to ingest content of a document and generate one or more vectors that embed each concept of the content. Herein, the term "concept" refers to a subject, topic, semantics, intent, or other high level meaning of the content.

In some embodiments, the embedding model engine 130 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally, d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, where content includes text, the embedding model engine 130 may include a word and/or phrase vectorization model trained to embed each word and/or phrase as a vector encoding the word and/or phrase as well as the context within the document. For example, in some embodiments, the embedding model engine 130 may include, e.g., word2vec, GloVe, GN-GloVe, Flair embeddings, AllenNLP ELMo, Bidirectional Encoder Representations from Transformers (BERT), fastText, Gensim, Indra, Deeplearning4j. Principal Component Analysis (PCA), T-Distributed Stochastic Neighbour Embedding (t-SNE), among other embedding models, including any other suitable neural network or other machine learning technique or any combination thereof.

In some embodiments, the embedding model engine 130 may produce a set of embedding vectors for each of the input document 108 and the stored documents 109. In some embodiments, the embedding vectors of the input document 108 may be used to search the embedding vectors of the stored documents 109 to identify associated stored documents 109 matching the concepts of the input document 108.

In some embodiments, more efficiently search the stored documents 109, the document search system 100 may employ an aggregation engine 140 to produce an aggregated embedding vector for each document. The aggregated embedding vector may represent one or more concepts of the content of each document, rather than of each word and/or phrase within the content of each document. In some embodiments, the aggregation engine 140 may use any suitable aggregation technique, such as, e.g., an average, median, distribution, normal distribution, gaussian distribution, sum, product, or other suitable aggregation of the embedding vectors for each document. As a result, the aggregated embedding vector of the input document 108 may be used to efficiently search for stored documents 109 having the same or similar concepts based on the aggregated embedding vector of each stored document 109.

In some embodiments, the aggregation engine 140 may include, e.g., a memory having instructions stored thereon, as well as, e.g., a buffer to load data and instructions for processing, a communication interface, a controller, among other hardware. A combination of software and hardware may then be implemented by the similarity engine 150 in conjunction with the processor 105 or a processor dedicated to the aggregation engine 140 to implement the instructions stored in the memory of the aggregation engine 140.

In some embodiments, a similarity engine 150 receives the aggregated embedding vector of the input document 108 and the aggregated embedding vector of each stored document 109. In some embodiments, the similarity engine 150 may include, e.g., a memory having instructions stored thereon, as well as, e.g., a buffer to load data and instructions for processing, a communication interface, a controller, among other hardware. A combination of software and hardware may then be implemented by the similarity engine 150 in conjunction with the processor 105 or a processor dedicated to the similarity engine 150 to implement the instructions stored in the memory of the similarity engine 150.

In some embodiments, the similarity engine 150 may use a similarity measure to determine a similarity score between the aggregated embedding vector of the input document 108 and the aggregated embedding vector of each stored document 109. In some embodiments, the similarity measure may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. Thus, the similarity engine 150 may determine a score indicative of a probability of a match between the input document 108 and each stored document 109.

In some embodiments, the similarity engine 150 utilizes a machine learning model to compare the first data entity feature vectors with each candidate matching second data entity feature to generate a probability of a match. Thus, in some embodiments, the similarity engine 150 utilizes, e.g., a classifier to classify entities and matches based on a probability. In some embodiments, the classifier may include, e.g., random forest, gradient boosted machines, neural networks including convolutional neural network (CNN), among others and combinations thereof. Indeed, in some embodiments, a gradient boosted machine of an ensemble of trees is utilized. In some embodiments, the classifier may be configured to classify a match where the probability of a match exceeds a probability of, e.g., 90%, 95%, 97%, 99% or other suitable probability based on the respective data entity feature vectors.

In some embodiments, a database management engine 160 receives the matching stored documents and the respective probability scores as determined by the similarity engine 150. In some embodiments, the database management engine 160 may include, e.g., a memory having instructions stored thereon, as well as, e.g., a buffer to load data and instructions for processing, a communication interface, a controller, among other hardware. A combination of software and hardware may then be implemented by the database management engine 160 in conjunction with the processor 105 or a processor dedicated to the database management engine 160 to implement the instructions stored in the memory of database management engine 160.

In some embodiments, the database management engine 160 may map the input document 108 to the matching stored documents. In some embodiments, the database management engine 160 may also or alternatively return a ranked list of the matching stored documents to the user in response to the query. In some embodiments, the ranked list may include, e.g., matching stored documents having a similarity score and/or probability score exceeding a match threshold, e.g., greater than or equal to 0.4, 0.5, 0.6, 0.7, 0.8, 0.9 probability, greater than a predetermined similarity measure, having within an Nth highest similarity and/or probability where N is, e.g., a top 5, top 6, top 7, top 8, top 9, top 10, top 15, top 20, top 25, top 30, top 35, top 40, top 45, top 100, or other suitable highest similarity and/or probability in a ranked list of the matching stored documents.

Figure 2:
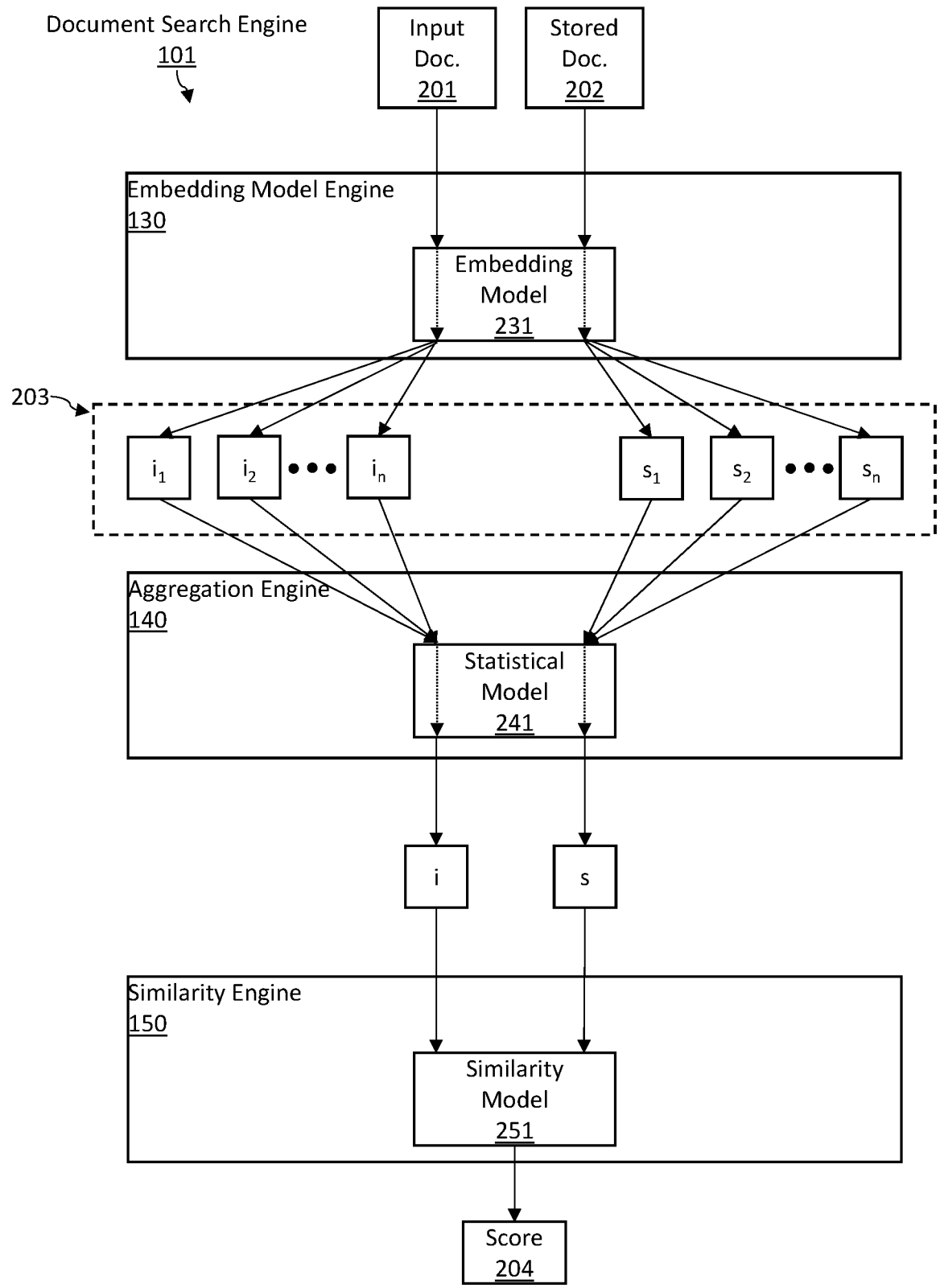
FIG. 2 depicts a block diagram of an embedding model engine 130 for learned word embeddings for document searching in accordance with one or more embodiments of the present disclosure.

FIG. 2 depicts a block diagram of an embedding model engine 130 for learned word embeddings for document searching in accordance with one or more embodiments of the present disclosure.

In some embodiments, the embedding model engine 130 of the document search engine 110 may ingest an input document 201 of a search query and a stored document 202. In some embodiments, the document search engine 110 may search stored documents 109 based on the input document 201 and/or to train word embeddings based on a pairing of the input document 201 and the stored document 202. Accordingly, during a search of the stored documents, the input document 201 may be paired with the stored document 202 to compare the semantics of the input document 201 with the stored document 202. In some embodiments, when searching the stored document database 107, document search engine 110 may iteratively pair the input document 201 to each the stored documents 109 to determine similarity. In some embodiments, during training of the embedding model 231, the input document 201 may be selected from the input documents 108 in the input document database 106 that has a known association with the stored document 201. In some embodiments, the embedding model engine 130 may use an embedding model 231 to represent an input document 201 and a stored document 202 as a set of word embeddings 203. In some embodiments, the word embeddings 203 may include input word embeddings $i_1$, $i_2$ through $i_n$ for the input document 201 and stored word embeddings $s_1$, $s_2$ through $s_n$ for the stored document 202.

In some embodiments, the embedding model 231 may be a trained model that maps content to vectors that form numerical representations of concepts and/or semantics within each document. In some embodiments, the embedding model 231 may include, e.g., learned embeddings that map words and/or phrases to particular vectors, a trained machine learning model to generate an embedding for each word, or other suitable model trained to produce the word embeddings 203. For example, in some embodiments, a trained machine learning model may include, e.g., word2vec, bag-of-words, BERT, one or more neural networks, or other suitable machine learning model. In some embodiments, the output of the embedding model engine 130 for the input document 201 and the stored document 202 may include two sets of word embeddings 203 stored in v by k matrices where v is the size of the vocabulary and k is the dimensionality of the word embeddings 203.

In some embodiments, the word embeddings 203 from the input document 201 may be aggregated into a single aggregate word embedding i. Similarly, the word embeddings 203 from the stored document 202 may be aggregated into a single aggregate word embedding s. In some embodiments, the statistical model 241 may include, e.g., an average, median, distribution, normal distribution, gaussian distribution, sum, product, or other suitable aggregation of the embedding vectors for each document.

In some embodiments, as described above, the importance and/or discriminative ability of words in different locations within a structure of each document may vary. Thus, in some embodiments, the aggregation engine 140 may separately apply the statistical model 241 to the word embeddings 203 of each particular location in the structure of the input and stored documents 201 and 202. In some embodiments, the separate aggregate word embeddings 203 may then be combined, e.g., via statistical aggregation, via concatenation into a vector or array, or in any other suitable manner or any combination thereof. Thus, input document embedding i and the stored document embedding s may represent a fingerprint of a document such that each document of a pair of documents may be compared.

In some embodiments, aggregating the word embeddings 203 of each document enables efficient similarity measurement between each pair of documents. Accordingly, in some embodiments, the similarity engine 150 may use the aggregated input embedding i and the aggregated stored embedding s of the pair of the input document 201 and the stored document 202 to determine a similarity measure using the similarity model 251. In some embodiments, the similarity measure may include, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure.

In some embodiments, the similarity model 251 may calculate the similarity measure between the input document 201 and the stored document 202 based on the respective aggregate word embeddings i and s. In some embodiments, the similarity measure may be used as or may be used to produce a relevancy score 204 quantifying the relevance of the stored document 202 to the input document 201 in response to the search query. The relevance score 204 enables potentially relevant stored documents for a given input document 201 to be ranked, thus allowing the most relevant stored documents to be returned to the user in response to the search query.

Figure 3A:
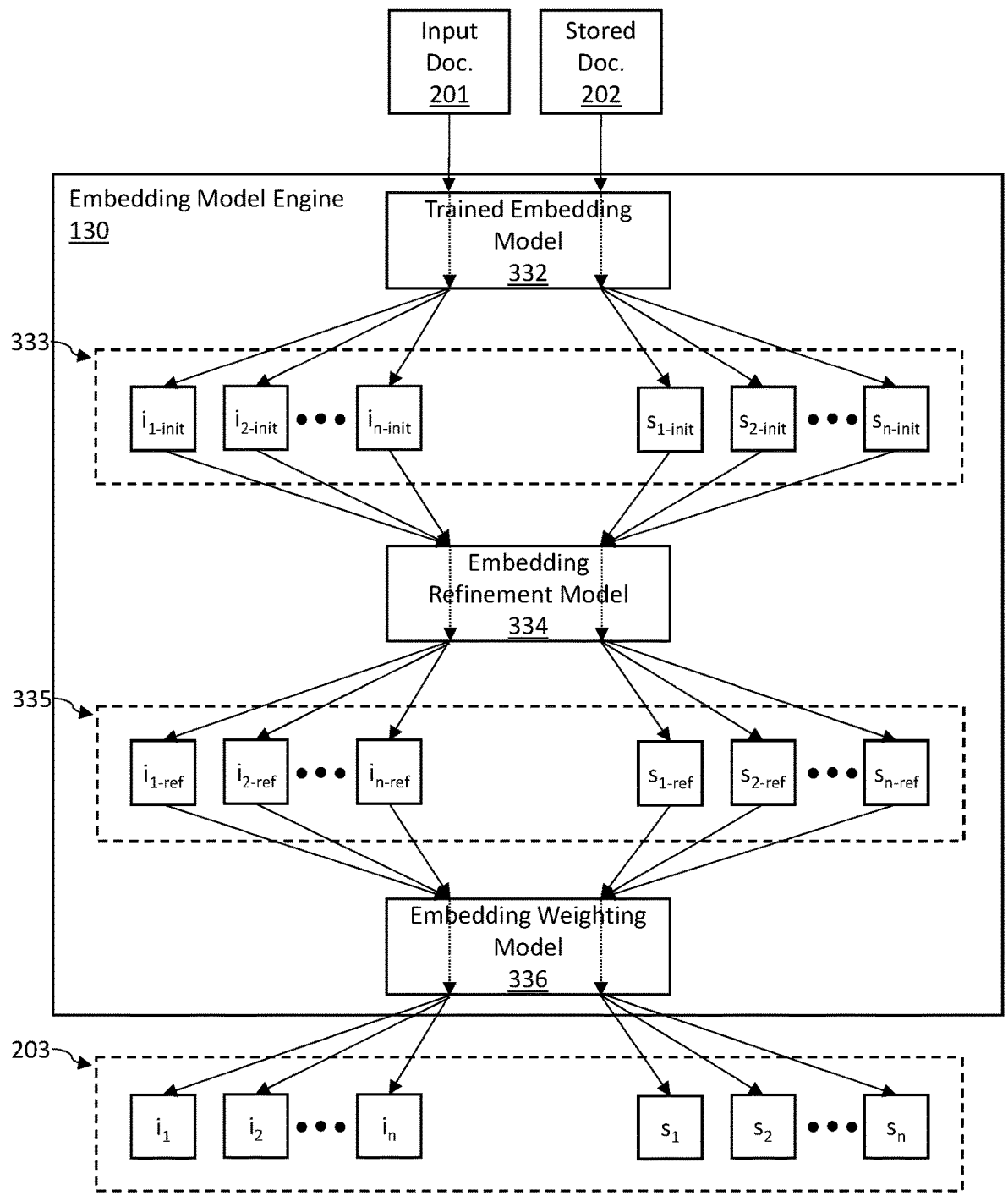
FIG. 3A and FIG. 3B illustrate a block diagram for training the word embedding model 231 for efficient stored document searching based on an input document in accordance with one or more aspects of embodiments of the present disclosure.
Figure 3B:
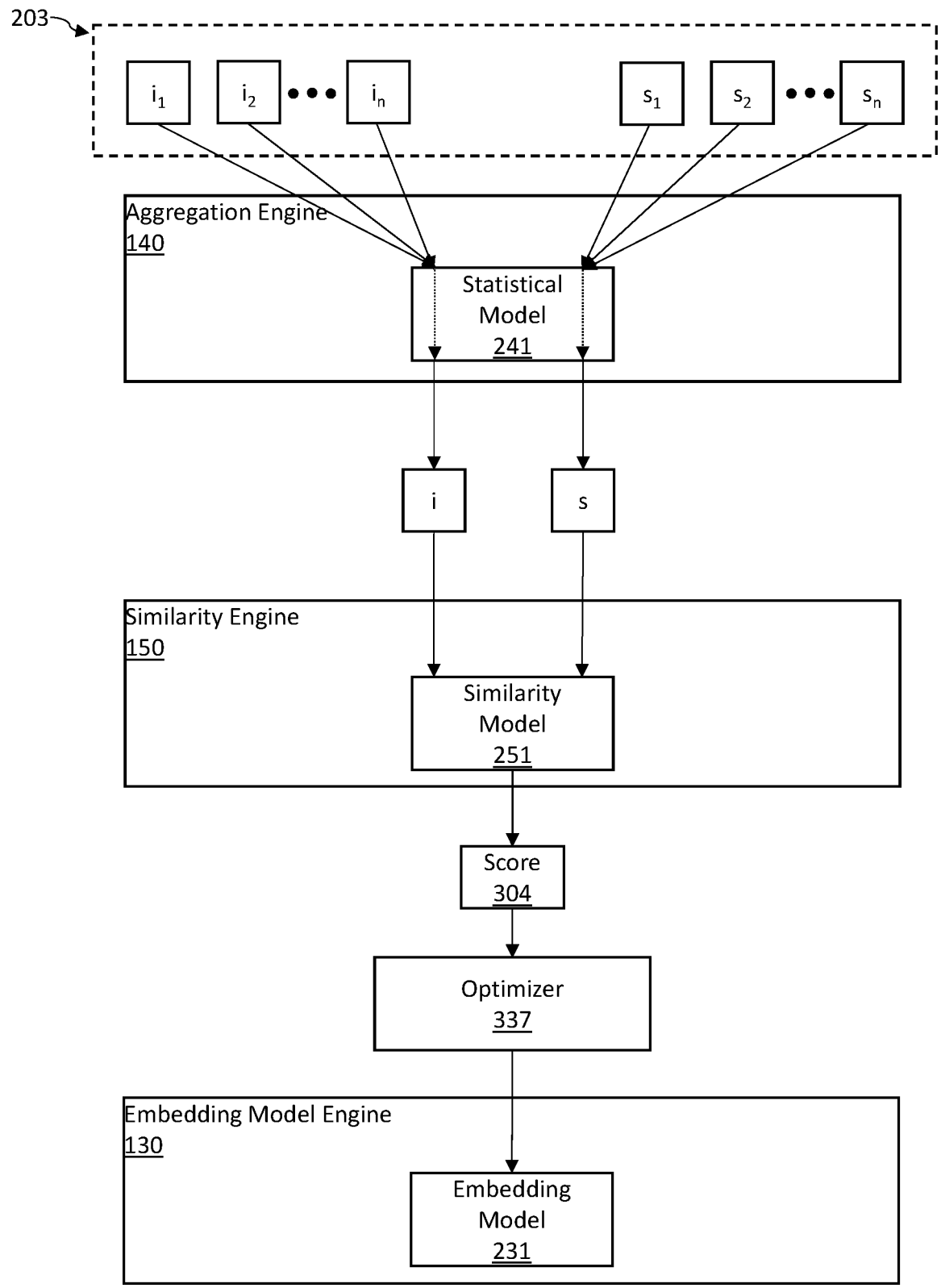

FIG. 3A and FIG. 3B illustrate a block diagram for training the word embedding model 231 for efficient stored document searching based on an input document in accordance with one or more aspects of embodiments of the present disclosure.

In some embodiments, the embedding model engine 130 may be used to represent input and stored documents by averaging the embeddings of all words within each document. A learning objective may be defined to maximizes the similarity of input and stored documents that are associated with one another and minimizes the similarity for input and stored documents that are not associated. This objective leads to superior performance over both key word based search engines and using word embedding models directly because the model explicitly learns word relationships between the input and stored documents. The embedding model engine 130 takes content (e.g., text, code, etc.) from the input and stored documents as input and produces relevancy scores for input document-stored document pairs allowing potentially relevant controls for a given input document 201 to be ranked.

In some embodiments, the trained embedding model 332 may include a suitable natural language processing (NLP) model for embedding each word in a vector (word embedding). Any suitable NLP model may be used, such as, e.g., word2vec, Bidirectional Encoder Representations from Transformers (BERT), or other suitable word embedding model. Thus, the trained embedding model 332 may leverage numerical word representations to produce initial word embeddings 333 to make the associations. These initial word embeddings 333 numerically encode the semantic value of words and allow for mathematical operations to be used to determine the degree of semantic similarity between a pair of documents. The advantage of this technique is that input document 201 to stored document 202 associations are made based on the semantic similarity between the documents opposed to relying on keyword matching techniques used by so-called "traditional" search engine solutions.

In some embodiments, the pretrained embedding model 332 may be pretrained based on a larger and/or more general corpus of documents, such as publicly available news articles, or other large set of documents. Such training is time consuming and processor intensive. Accordingly, a pretrained model reduces the need for such training, and indeed enables more efficient training via the transfer of information learned from a much larger dataset to a specific task and/or document type, thus enhancing the overall quality and generality of the embedding model engine 130.

In some embodiments, an embedding refinement model 334 may refine the initial word embeddings 333 to produce refined word embeddings 335. In some embodiments, the embedding refinement model 334 may use the initial word embeddings 333 to attempt to predict each word in the document, e.g., based on the surrounding words (e.g., based on the context). Accordingly, the embedding refinement model 334 may utilize, e.g., a word2vec model and/or a semantic vector space model, such as continuous bag-of-words. In some embodiments, the embedding refinement model 334 may be trained based on the stored documents 109, a subset of the stored documents 109, or other dataset of documents applicable to the content of the input document 201 and the stored document 202.

In some embodiments, the embedding refinement model 334 may update the initial word embeddings 333 based on an error in predicting each word. For example, the embedding refinement model 334 may determine an error in each prediction and backpropagate the error to the initial word embeddings 333 such as, e.g., using a suitable backpropagation technique and update technique (e.g., gradient descent or variants thereof among other suitable techniques or any combination thereof). As a result, the embedding refinement model 334 may produce the refined word embeddings 335 to map concepts more accurately and/or semantics to each document.

In some embodiments, because the document search system 100 determines the compatibility of input documents to stored documents by comparing averaged word embeddings, weighting the word embeddings according to importance in representing the concepts of each document may improve the accuracy of the embedding model engine 130. In some embodiments, any suitable embedding weighting model 336 may be employed to determine the importance of each of the refined word embeddings 335 and weight each refined word embedding 335 according to the respective importance.

In some embodiments, words that are common across documents may indicate words that are less likely to contribute to a particular concept of a particular document. Accordingly, the frequency of each word across the input documents and the stored documents may be used as a metric to indicate relative importance of each word, where increased frequency indicates less importance. Thus, the embedding weighting model 336 may employ inverse document frequency to determine weights for each of the refined word embeddings 335. This weighting leads to averages where words that occur across many documents are discounted, as they provide less discriminative ability.

In some embodiments, the embedding weighting model 336 may utilize any suitable term-weighting scheme. For example, in some embodiments, to capture the discriminative ability of words based on frequency, the embedding weighting model 336 may utilize an inverse document frequency, term frequency-inverse document frequency (TF-IDF) model or other suitable model and/or algorithm that scales a weighting for each word, e.g., proportionally, logarithmically, exponentially, or other relationship, based on the frequency across documents. As a result, the embedding weighting model 336 may modify each refined word embedding 335 to produce final word embeddings 203 that map words to semantics and/or concepts for the content of the input documents and the stored documents.

In some embodiments, the discriminative ability of each word may also vary according to a location within a structure of a document. Accordingly, the embedding weighting model 336 may separately assess frequency and/or TF-IDF for words appearing in each separate section within a structure of a document. For example, a hypertext markup language (HTML), formatted and/or rich-text document may include structure including a title, headings, etc. For example, the discriminative ability of a word in a title may be increased relative to the same word in a body. Thus, the embedding weighting model 336 may use the location of each word within a structure of each document to determine a location specific weighting for each refined word embedding 335.

In some embodiments, the ultimate output of the embedding model engine 130 for each input document 201 and stored document 202 is two sets of word embeddings 203 stored in v by k matrices where v is the size of the vocabulary and k is the dimensionality of the word embeddings 203.

In some embodiments, the word embeddings 203 may be aggregated for each of the input document 201 and the stored document 202 using the statistical model 241 of the aggregation engine 140. In some embodiments, the statistical model 241 may include, e.g., an average, median, distribution, normal distribution, gaussian distribution, sum, product, or other suitable aggregation of the embedding vectors for each document. Accordingly, the aggregation engine 140 may output an aggregated input embedding i and an aggregated stored embedding s.

In some embodiments, as described above, the importance and/or discriminative ability of words in different locations within a structure of each document may vary. Thus, in some embodiments, the aggregation engine 140 may separately apply the statistical model 241 to the word embeddings 203 of each particular location in the structure of the input and stored documents 201 and 202. In some embodiments, the separate aggregate word embeddings 203 may then be combined, e.g., via statistical aggregation, via concatenation into a vector or array, or in any other suitable manner or any combination thereof. Thus, input document embedding i and the stored document embedding s may represent a fingerprint of a document such that each document of a pair of documents may be compared.

In some embodiments, aggregating the word embeddings 203 of each document enables efficient similarity measurement between each pair of documents. Accordingly, in some embodiments, the similarity engine 150 may use the aggregated input embedding i and the aggregated stored embedding s of the pair of the input document 201 and the stored document 202 to determine a similarity measure using the similarity model 251. In some embodiments, the similarity measure may include, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure.

The embedding model 231 takes content (e.g., text, code, etc.) from the input and stored documents as input and produces relevancy scores for input document-stored document pairs allowing potentially relevant stored documents for a given input document 201 to be ranked.

In some embodiments, the use of the trained embedding model 332, the embedding refinement model 334 and the embedding weighting model 336 to determine the word embeddings 203 for each new input document 201 may be computational expensive. Thus, the embedding model engine 130 may use the word embeddings 203 for historical input documents 201 and historical stored documents 202 to train a direct embedding model 338 that directly embeds the words of the input document 201 and the stored document 202 to the word embeddings 203.

In some embodiments, the training procedure iterates over input document 201 and stored document 202 pairs and computes ranking losses based on existing and non-existing input-to-stored mappings. In some embodiments, one epoch of training is performed as follows.

Let $(I_i, S_j) \in I_k$ denote the k dimensional input document 201 embeddings and stored document 202 embeddings of an existing input document 201 and stored document 202 mapping and let $(I_i, S_d)$ denote a non-existing mapping. For each existing pair, N non-existing pairs are sampled at random, and the following loss is computed.

$$\mathrm{loss}(I_i, S_j) = \Sigma_{d=1}^{N} \mathrm{margin\_loss}(I_i, S_j, S_d) \quad (1)$$

$$\mathrm{margin\_loss}(I_i, S_j, S_d) = \max(0, (\cos\cos(I_i, S_d) - \cos\cos(I_i, S_j)) + \mathrm{margin}) \quad (2)$$

Here margin∈[0,1] is a number used to control the difference in the similarity measure between existing and non-existing embeddings. The input document 201 and stored document 202 embeddings are produced by aggregating, by the aggregation engine 140 using the statistical model 241, over the word embeddings 203 of all words that comprise the input document 201 and stored document 202.

$$I_i = \frac{1}{L} \sum_{t=1}^{L} i_t \quad (3)$$

$$S_i = \frac{1}{M} \sum_{t=1}^{M} s_t \quad (4)$$

Here $i_t$ and $s_t$ are k dimensional learnable word embeddings for the input document 201 and the stored document 202, respectively. This objective leads to superior performance over key word based search engines because the model explicitly learns word relationships between the input and stored documents.

In some embodiments, gradient descent and backpropagation may be used to update the word embeddings 203 and minimize the loss. Note that the margin_loss is 0 if the similarity measure between the existing pair is greater than the non-existing pair by margin. In some embodiments, no update is made to the trained embedding model 332 which is a property that helps to avoid overfitting and improves model generalization.

In some embodiments, the learned word embeddings may form the embedding model 231. In some embodiments, the embedding model 231 may directly map words in an input document to word embeddings for comparison to the word embeddings of each stored document 109 in the stored document database 107 for more efficient searching of the stored document database 107.

In some embodiments, the word embeddings 203 learned are unconstrained in terms of magnitude. Some words may end up having embeddings with large values while others have smaller values. Because the objective of the embedding model 231 is to maximize similarity between aggregate word embeddings, embeddings with larger magnitudes suppress contributions of other words. This can be seen as a form of automatic soft stop word removal. Such automatic stop word removal is advantageous over manual selection because the process is more data driven versus relying on the best judgement of a human curator.

Figure 4A:
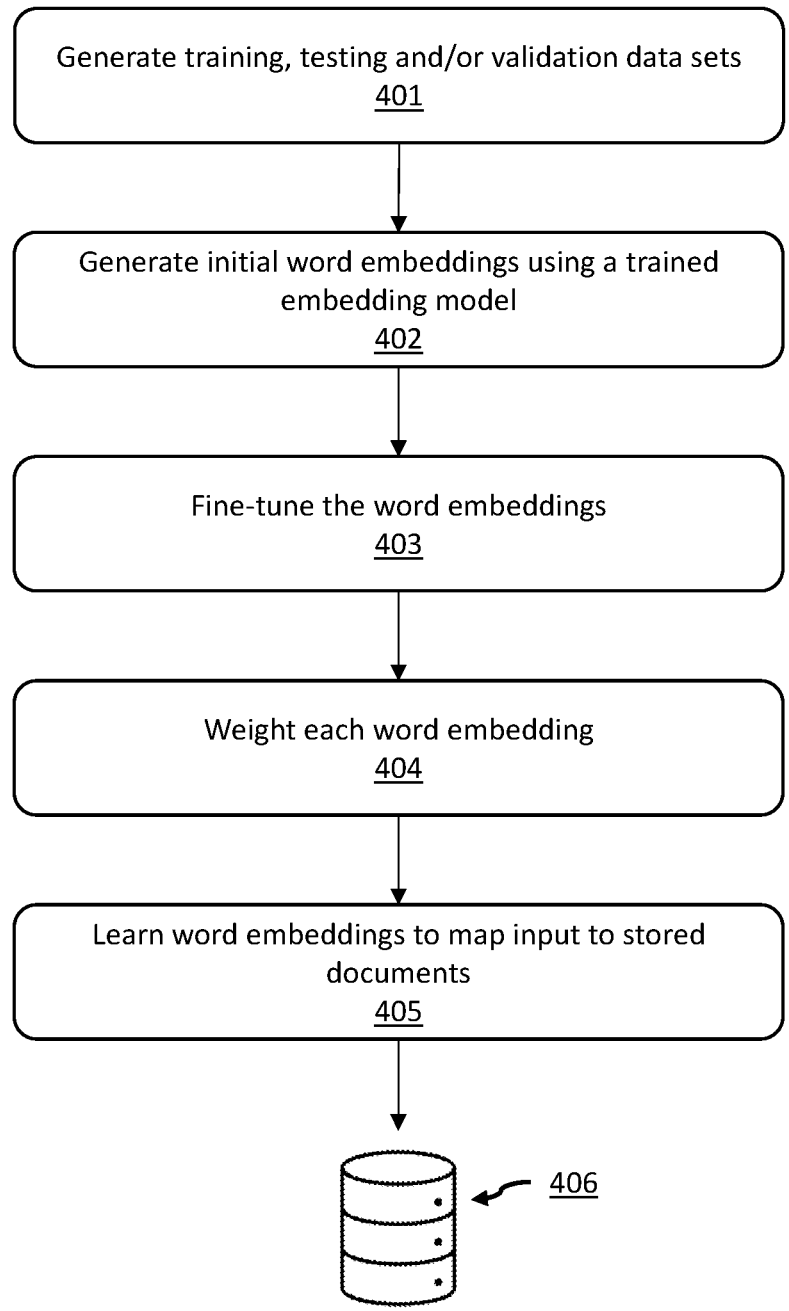
FIG. 4A illustrates a flowchart for an exemplary methodology for training an embedding model for document searching in accordance with one or more aspects of embodiments of the present disclosure.

FIG. 4A illustrates a flowchart for an exemplary methodology for training an embedding model for document searching in accordance with one or more aspects of embodiments of the present disclosure.

In some embodiments, at step 401, the document search system 100 may generate training, testing and/or validation data sets. The training, testing and/or validation data sets may include one or more input documents 108 sorted in the input document database 106 and one or more stored documents 109 in the stored document database 107. In some embodiments, pairs of input documents 108 paired with stored documents 109 may be formed based on each possible combination of input document 108 to stored document 109 pairing.

In some embodiments, at step 402, the document search system 100 may generate initial word embeddings for each of the input document and the stored document in a pair. In some embodiments, the document search system 100 may employ a trained word embedding model such as, e.g., word2vec, BERT, bag-of-words, among others or any combination thereof.

In some embodiments, at step 403, the document search system 100 may fine-tune the initial word embeddings. In some embodiments, to fine-tune the initial word embeddings, the document search system 100 may use the initial word embeddings to attempt to predict each word in a particular document, e.g., based on the surrounding words (e.g., based on the context). Accordingly, the document search system 100 may utilize, e.g., a word2vec model and/or a semantic vector-space model, such as continuous bag-of-words, skip-gram, etc. trained based on the stored documents 109, a subset of the stored documents 109, or other dataset of documents. In some embodiments, the fine-tuning the initial word embeddings may include updating the initial word embeddings based on an error in predicting each word.

In some embodiments, because the document search system 100 determines the compatibility of input documents to stored documents by comparing averaged word embeddings, the document search system 100 may, at step 404, weight the word embeddings according to importance in representing the concepts of each document. In some embodiments, any suitable embedding weighting model may be employed to determine the importance of each of the refined word embeddings and weight each refined word embedding according to the respective importance.

In some embodiments, words that are common across documents may indicate words that are less likely to contribute to a particular concept of a particular document. Accordingly, the frequency of each word across the input documents and the stored documents may be used as a metric to indicate relative importance of each word, where increased frequency indicates less importance. Thus, inverse document frequency may be employed to determine weights for each of the refined word embeddings. This weighting leads to averages where words that occur across many documents are discounted, as they provide less discriminative ability.

In some embodiments, the document search system 100 may utilize any suitable term-weighting scheme. For example, in some embodiments, to capture the discriminative ability of words based on frequency, the document search system 100 may utilize an inverse document frequency, term frequency-inverse document frequency (TF-IDF) model or other suitable model and/or algorithm that scales a weighting for each word, e.g., proportionally, logarithmically, exponentially, or other relationship, based on the frequency across documents. As a result, final word embeddings 203 may be produced that map words to semantics and/or concepts for the content of the input documents and the stored documents.

In some embodiments, the discriminative ability of each word may also vary according to a location within a structure of a document. Accordingly, the document search system 100 may separately assess frequency and/or TF-IDF for words appearing in each separate section within a structure of a document. For example, a hypertext markup language (HTML), formatted and/or rich-text document may include structure including a title, headings, etc.

In some embodiments, at step 405, the document search system 100 may learn word embeddings to map input to stored documents. To do so, in some embodiments, the document search system 100 may employ, e.g., a similarity between each input document and stored document pair based on the weighted word embeddings, and a margin rank loss scheme to learn the word embeddings. In some embodiments, the final word embeddings upon learning may be stored with the associated stored documents in the stored document database 107. Accordingly, searching with an input query including a new input document may be performed against the learning embeddings of each stored document 109 in the stored document database 107 for more efficient searching based on the content of the new input document.

In some embodiments, the document search system 100, e.g., via the database management engine 160, may structure the stored document database 107 for more efficient searching. For example, in some embodiments, the database management engine 160 may construct a k-d tree or other binary partition tree or space partitioning scheme to organize the word embeddings of the stored documents 109. Accordingly, searching the stored documents 109 may be made more efficient upon a search query with a new input document 108.

Figure 4B:
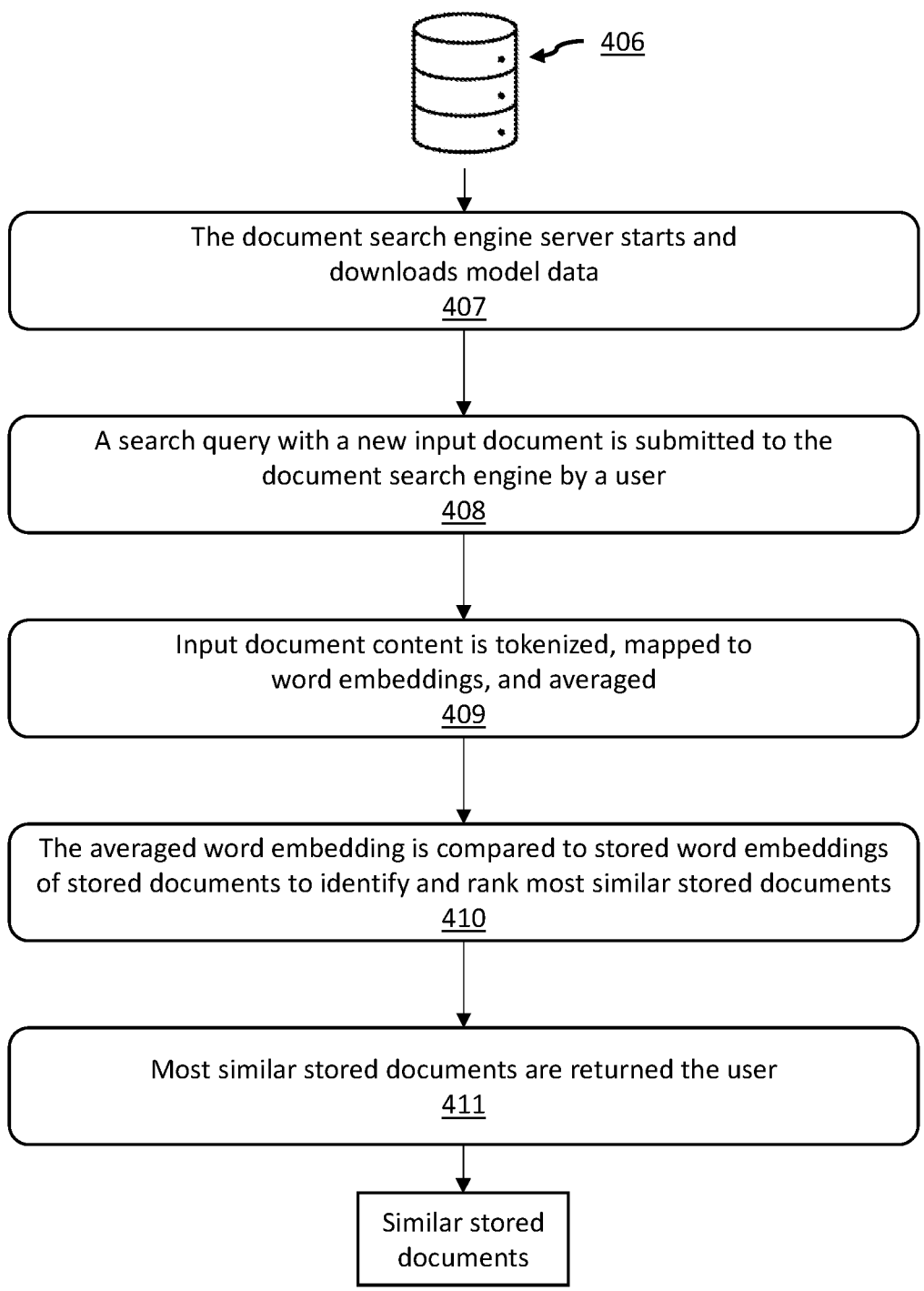
FIG. 4B illustrates a flowchart for an exemplary methodology for applying an embedding model for document searching in accordance with one or more aspects of embodiments of the present disclosure.

FIG. 4B illustrates a flowchart for an exemplary methodology for applying an embedding model for document searching in accordance with one or more aspects of embodiments of the present disclosure.

In some embodiments, upon training the word embeddings and storing the word embeddings in the stored document database 107, the document search engine 110 may use the word embeddings to search stored documents relevant to a new input document. Accordingly, in some embodiments, a server associated with the document search engine 110 (e.g., the document search system 100), may initialize the document search engine 110 and the embedding model engine 130, including downloading from the stored document database 107 the trained model data. In some embodiments, the trained model data may include the learned word embeddings and cached word embeddings for each stored document 109. In some embodiments, using the cached word embeddings enable the document search engine 110 to search the stored documents 109 without having to re-embed the content of each stored document 109 for each search, thus improving efficiency of the search.

In some embodiments, at step 408, the document search engine 110 may receive a search query from the user, including a new input document. In some embodiments, the search query may include a user selection (e.g., via the user input device 102) that refers to, includes, or otherwise specifies the input document that is to be the subject of the search. In some embodiments, the user may upload the new input document as part of the search query. Alternatively, or in addition, the user may select a reference to a pre-existing input document in the input document database 106 such that the document search engine 110 may access the input document to perform the searching based on the reference.

In some embodiments, upon accessing and/or receiving the input document, the document search engine 110 may, at step 409, tokenize the input document, map the words to word embeddings, and aggregate the word embeddings to produce an aggregate word embedding.

In some embodiments, tokenization may include generating a set of tokens representing the content of the document, where each token represents a unit of data, such as, e.g., a character, a sub-word, a word, a phrase, or other suitable token. Accordingly, in some embodiments, tokenization may include one or more techniques for breaking the content of the document up into the tokens representing the content. The technique(s) may include, e.g., delimiting by period, comma, semi-colon, colon, space or other punction or any combination thereof, byte pair encoding (BPE), dictionary-based tokenization, among other tokenization techniques or any combination thereof.

In some embodiments, generating the word embeddings may include, e.g., mapping the words to the learned word embeddings, generating word embeddings with a trained word embedding model (such as, e.g., word2vec, BERT, BOW, CBOW, etc.), or by any other suitable word embedding model or any combination thereof, including the techniques described above.

In some embodiments, the word embeddings may be fine-tuned. In some embodiments, fine-tuning the word embeddings may use one or more techniques to attempt to predict each word in the document, e.g., based on the surrounding words (e.g., based on the context). Such techniques may include, e.g., a bag-of-words model, such as continuous bag-of-words.

In some embodiments, the initial word embeddings may be updated based on an error in predicting each word such as by, e.g., using a suitable backpropagation technique and update technique (e.g., gradient descent or variants thereof among other suitable techniques or any combination thereof).

In some embodiments, mapping the words to the learned word embeddings enable the document search engine 110 to learn a set of word embeddings. The set of word embeddings are constructed to enable a comparison of semantics between an input document and a stored document. The combination of initializing the word embeddings with a pre-trained model and fine-tuning the word embeddings, as described above, enables a more accurate model that tailored to the stored documents and input documents. In some embodiments, to map to learned word embeddings, the document search engine 110 may employ a trained model, e.g., trained as described above (e.g., with reference to FIGS. 3A and 3B), that is configured to map input text to the learned word embeddings.

In some embodiments, the word embeddings for the input document may be statistically aggregated to produce a final aggregate word embedding representing the input document. In some embodiments, the word embeddings for each stored document may also be statistically aggregated by the same statistical aggregation technique as the input document. In some embodiments, the aggregate word embeddings for each stored document may instead be pre-aggregated and cached with each stored document in the stored document database 107. Thus, the document search engine 110 may simply access the aggregate word embedding for each stored document rather than expending resources to re-aggregate the word embeddings.

In some embodiments, the suitable aggregation technique may include, e.g., an average, median, distribution, normal distribution, gaussian distribution, sum, product, or other suitable aggregation of the embedding vectors for each document. As a result, the aggregate word embedding may form an aggregated embedding vector representative of each document. Such an aggregated embedding vector formed for each document may be used to efficiently search for stored documents 109 having the same or similar concepts to the input document based on the aggregated embedding vector of each stored document 109.

In some embodiments, at step 410, the aggregate word embeddings for each of the input document and each stored document may be compared to identify and rank the stored documents based on similarity to the input document. The comparison may include employing a similarity model that determines a value according to a similarity measure that indicates a degree of similarity between the aggregate word embedding of the input document and the aggregate word embedding of a particular stored document.

In some embodiments, the aggregate word embedding of the input document may be compared to the aggregate word embedding of each stored document in the stored document database 107, e.g., in a brute force approach. In some embodiments, to make the comparison more efficient, rather than brute force, the aggregate word embedding of the input document may be iteratively compared to a next stored document in a series of comparisons according to a traversal of a k-d tree. As described above, the database management engine 160 may build a k-d tree for the stored documents based on the word embeddings and/or aggregate word embeddings. Thus, the document search engine 110 may search through the stored documents using the aggregate word embedding of the input document to traverse the k-d tree and more efficiently identify the similar stored documents. In some embodiments, other space partitioning structures may be employed for searching the stored document database 107 or any suitable combination thereof.

In some embodiments, the similarity engine 150 may use a similarity measure to determine a similarity score between the aggregated embedding vector of the input document 108 and the aggregated embedding vector of each stored document 109. In some embodiments, the similarity measure may include, e.g., a binary score indicating whether there is an exact match (e.g., 0 or 1), or a similarity score produced by a similarity model such as, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measures.

In some embodiments, at step 411, the most similar stored documents may be identified and returned to the user in response to the search query. In some embodiments, the stored documents may be rank ordered according to the magnitude of the similarity score and a set of the highest scoring stored documents may be identified. In some embodiments, the set of the highest scoring stored documents may be defined by, e.g., a percentile threshold, a score threshold, a rank threshold, or any other suitable threshold. For example, a percentile threshold may include a suitable percentile to indicate a similar or relevant relationship between the input document and a particular stored document, such as, e.g., $75^{th}$ percentile, $80^{th}$ percentile, $85^{th}$ percentile, $90^{th}$ percentile, $91^{st}$ percentile, $92^{nd}$ percentile, $93^{rd}$ percentile, $94^{th}$ percentile, $95^{th}$ percentile, $96^{th}$ percentile, $97^{th}$ percentile, $98^{th}$ percentile, $99^{th}$ percentile, or other suitable percentile threshold. In another example, a suitable rank threshold may include, e.g., a highest scoring stored document, two highest scoring stored documents, three highest scoring stored documents, four highest scoring stored documents, five highest scoring stored documents, six highest scoring stored documents, seven highest scoring stored documents, eight highest scoring stored documents, nine highest scoring stored documents, ten highest scoring stored documents, or other suitable rank threshold.

Thus, in some embodiments, the user may be presented with one or more stored documents that are similar and/or relevant to the input document based on the context, concepts and/or semantics of the content of the input document and of each stored document. In accordance with at least some embodiments of the present disclosure, the search results efficiently return/surface relevant information, even where such information may be represented by different words, phrases, formats, etc. in other documents, thus technologically improving upon so-called "traditional" key word and/or key phrase searches.

In some embodiments, the user may provide feedback via user selection to the document search engine 110 for improving and/or training the word embeddings and/or embedding model. For example, the user may confirm and/or deny the relevancy of one or more of the stored documents returned as similar. Such confirmation and/or denial may be provided as feedback for training based on the pairing of the input document and the one or more stored documents, thus improving the document search engine 110 based on user feedback.

Figure 5:
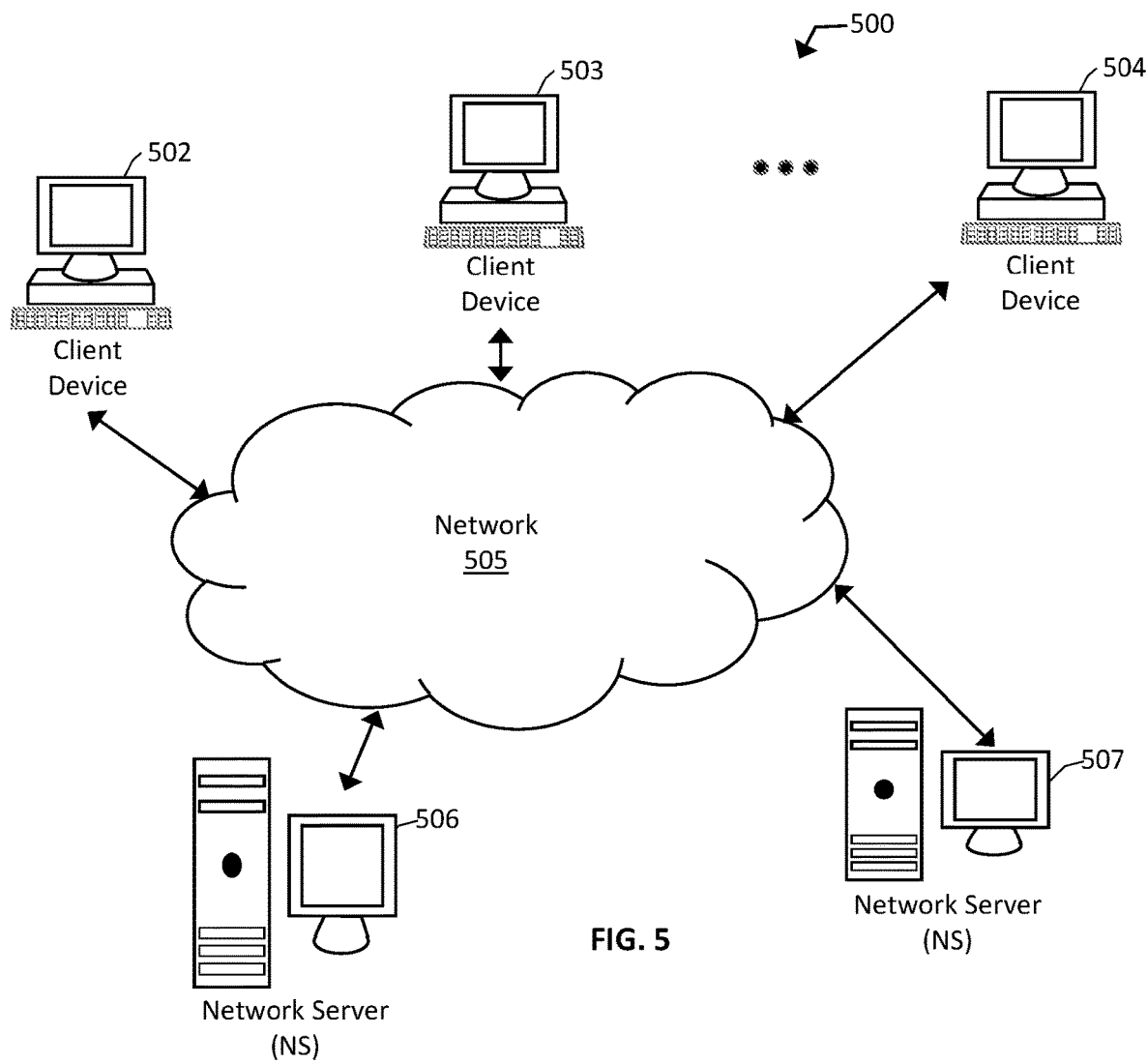
FIG. 5 depicts a block diagram of an exemplary computer-based system and platform for a document search engine in accordance with one or more embodiments of the present disclosure.

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, member computing device 502, member computing device 503 through member computing device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, GB-s citizens band radio, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 502-504 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 6:
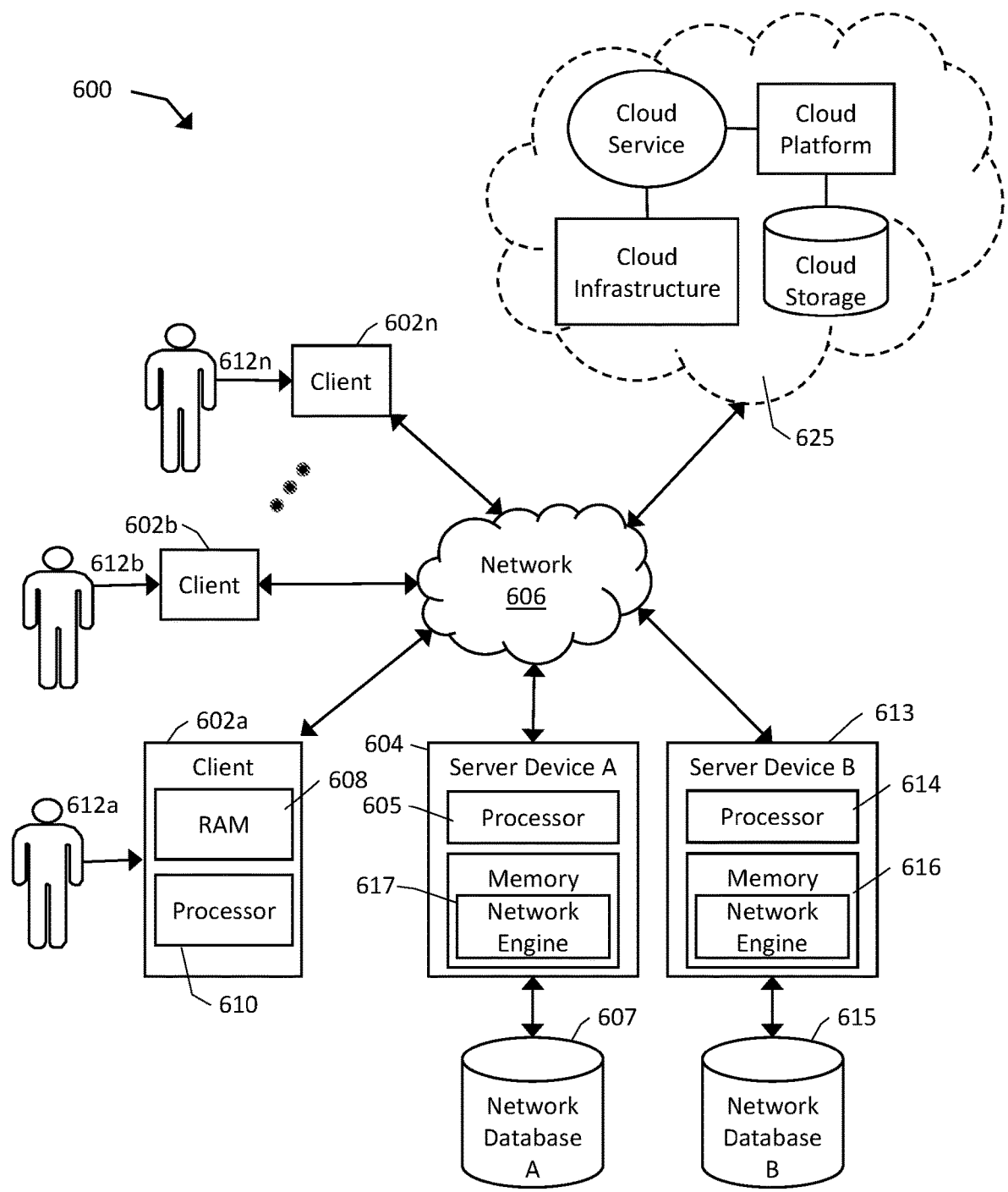
FIG. 6 depicts a block diagram of another exemplary computer-based system and platform for a document search engine in accordance with one or more embodiments of the present disclosure.

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 602a, member computing device 602b through member computing device 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, user 612a, user 612b through user 612n, may communicate over the exemplary network 606 with each other and/or with other systems and/or devices coupled to the network 606. As shown in FIG. 6, exemplary server devices 604 and 613 may include processor 605 and processor 614, respectively, as well as memory 617 and memory 616, respectively. In some embodiments, the server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
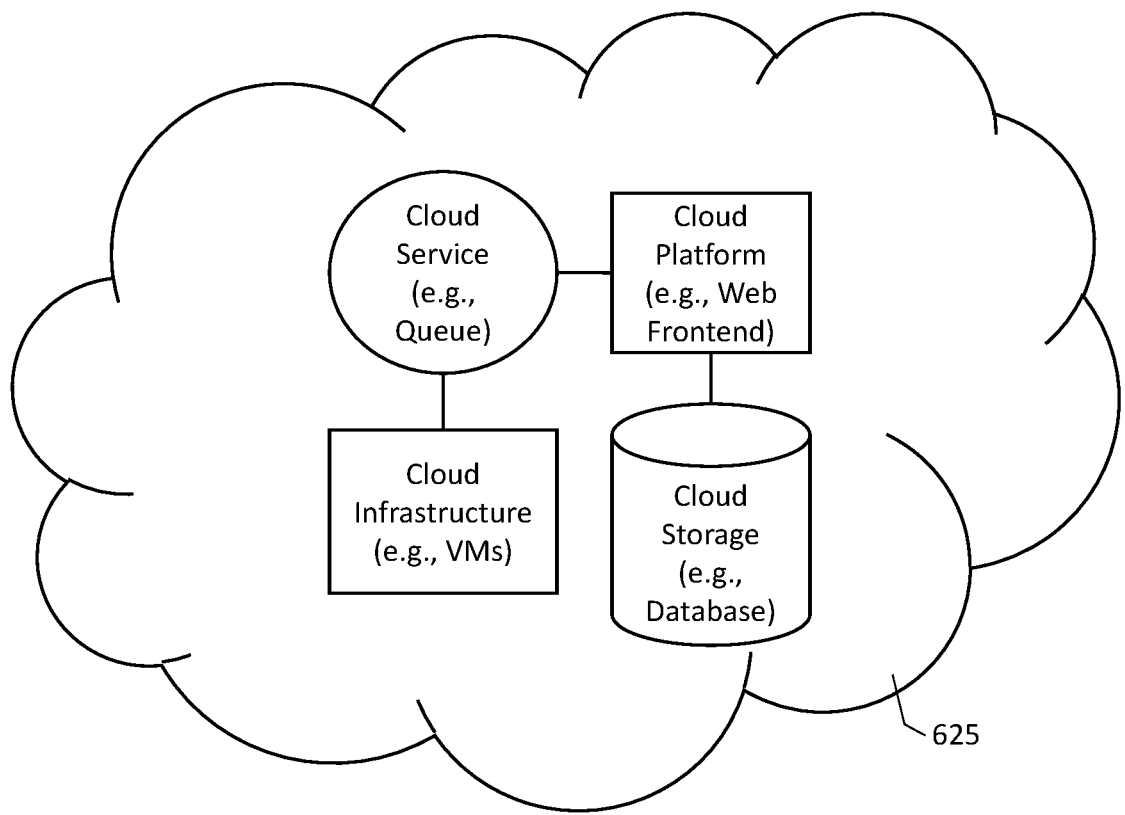
FIG. 7 depicts illustrative schematics of an exemplary implementation of the cloud computing/architecture(s) in which embodiments of a system for a document search engine may be specifically configured to operate in accordance with some embodiments of the present disclosure.
Figure 8:
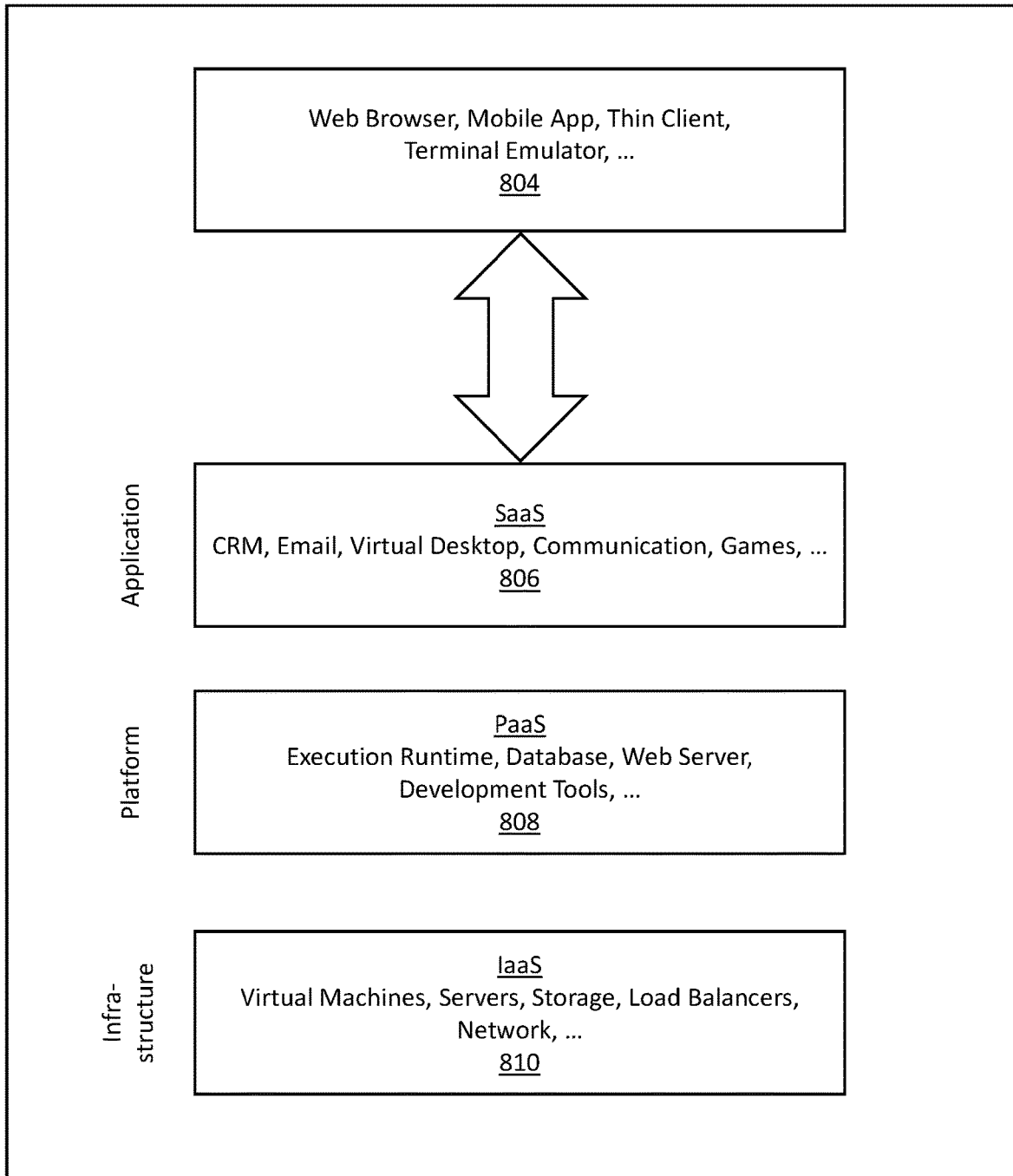
FIG. 8 depicts illustrative schematics of another exemplary implementation of the cloud computing/architecture(s) in which embodiments of a system for a document search engine may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeB SD, NetB SD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH),WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative, and not restrictive.

At least some aspects of the present disclosure will now be described with reference to the following numbered clauses.

1. A method including:
   receiving, by at least one processor, a search query from a computing device associated with a user;
      where the search query includes an input document having text;
   generating, by the at least one processor, a plurality of word embeddings within the input document;
      where the plurality of word embeddings include a plurality of vector representations of a plurality of words in the text of the input document;
   determining, by the at least one processor, an average input document word embedding vector for the plurality of word embeddings for the input document;
   accessing, by the at least one processor, a set of stored documents;
      where each stored document in the set of stored documents includes a stored text;
      where each stored document in the set of stored documents having a particular average stored document word embedding vector;
   utilizing, by the at least one processor, a similarity model to determine a similarity metric of a similarity between the input document and each stored document in the set of stored documents based at least in part on the average input document word embedding vector and the particular average stored document word embedding vector;
   generating, by the at least one processor, a ranked list of stored documents in the set of stored documents based at least in part on the similarity metric associated with each stored document; and
   instructing, by the at least one processor, the computing device to display the ranked list of stored documents in response to the search query.

2. A system including:
   at least one processor configured to execute software instructions that cause the at least one processor to perform steps to:
   receive a search query from a computing device associated with a user;
      where the search query includes an input document having text;
   generate a plurality of word embeddings for the input document;
      where the plurality of word embeddings include vector representations of a plurality of words in the text of the input document;
   determine an average input document work embedding vector for the plurality of word embeddings for the input document;
   access a set of stored documents;
      where each stored document in the set of stored documents includes a stored text;
      where each stored document in the set of stored documents having a particular stored document average word embedding vector;
   utilize a similarity model to determine a similarity metric of a similarity between the input document and each stored document in the set of stored documents based at least in part on the average input document word embedding vector and the particular average stored document word embedding vector;
   generate a ranked list of stored documents in the set of stored documents based at least in part on the similarity metric associated with each stored document; and
   instruct the computing device to display the ranked list of stored documents in response to the search query.

3. The method of clauses 1 and/or 2, where the similarity model includes a cosine similarity determination.

4. The method of clauses 1 and/or 2, further including:
   utilizing, by the at least one processor, a word vectorization model to generate the plurality of word embeddings for the input document;
   receiving, by the at least one processor, a user selection confirming or denying the similarity metric of at least one stored document in the ranked list of stored documents;
   determining, by the at least one processor, a similarity error based at least in part on a difference according to an optimization function between:
      i) the user selection confirming or denying the similarity metric of the at least one stored document in the ranked list of stored documents, and
      ii) a ranked position of the at least one stored document within the ranked list of the stored documents; and
   training, by the at least one processor, parameters of the word vectorization model based at least in part on the similarity error.

5. The method of clauses 1 and/or 2, further including:
   receiving, by the at least one processor, a user selection confirming or denying the similarity metric of at least one stored document in the ranked list of stored documents;

determining, by the at least one processor, a similarity error based at least in part on a difference according to an optimization function between:
  i) the user selection confirming or denying the similarity metric of the at least one stored document in the ranked list of stored documents, and
  ii) a ranked position of the at least one stored document within the ranked list of the stored documents; and
training, by the at least one processor, parameters of the similarity model based at least in part on the similarity error.

6. The method of clauses 1 and/or 2, where the similarity model includes an optimization objective to maximize the similarity metric between the input document and the set of stored documents.

7. The method of clauses 1 and/or 2 and/or 6, where the similarity model includes at least one clustering model.

8. The method of clauses 1 and/or 2, further including:
generating, by the at least one processor, a k-d tree of the set of stored documents; and
determining, by the at least one processor, the ranked list of stored documents by using the similarity model to traverse the k-d tree.

9. The method of clauses 1 and/or 2, further including:
receiving, by at least one processor, a new document having new text;
generating, by the at least one processor, a plurality of new word embeddings for the new document;
determining, by the at least one processor, a new average word embedding vector of the plurality of new word embeddings for the new document; and
storing, by the at least one processor, the new document in the set of stored documents;
  where storing the new document in the set of stored documents includes adding the new average word embedding vector to a cache of the stored average word embedding associated with the stored text of each stored document.

10. The method of clauses 1 and/or 2, where the average of the plurality of word embeddings includes a weighted average based at least in part on a section of the text in which each word is located.

11. The method of clauses 1 and/or 2, further including:
generating, by the at least one processor, a similarity alert based at least in part on the similarity metric of the input document to at least one stored document in the set of stored documents exceeding a predetermined similarity threshold; and
causing, by the at least one processor, the computing device to produce the similarity alert to the user to alert the user of the at least one stored document.

12. The method of clauses 1 and/or 2, where the input document includes a regulatory requirement document and the set of stored documents includes a set of business controls documents.

13. The method of clauses 1 and/or 2, further including instructing at least one activity execution device, by the at least one processor, to execute at least one activity associated with the input document according to a highest ranked stored document in the ranked list of stored documents.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
accessing, by at least one processor, a training set of stored documents;
  wherein the training set of stored documents comprise:
    at least one existing pair of stored documents representing at least one pair of stored documents that are similar to each other, and
    at least one non-existing pair of stored documents representing at least one pair of stored documents that are not similar to each other;
generating, by the at least one processor, a plurality of initial stored document word embeddings within each stored document of the set of stored documents;
  wherein the plurality of initial stored document word embeddings comprise a plurality of stored document vector representations of a plurality of words in text of each stored document;
determining, by the at least one processor, an average stored document word embedding vector for the plurality of initial stored document word embeddings for each stored document;
utilizing, by the at least one processor, a similarity model to determine a similarity metric of a similarity between a first stored document and a second stored document of each candidate pair of a plurality of candidate pairs of stored documents in the set of stored documents based at least in part on the average stored document word embedding vector of each of the first stored document and the second stored document;
generating, by the at least one processor, a plurality of refined stored document word embeddings for each stored document in the set of stored documents by backpropagating an error of the similarity metric of each candidate pair, wherein the error is based at least in part on the at least one existing pair and the at least one non-existing pair;
generating, by the at least one processor, a refined average stored document word embedding vector for the plurality of refined stored document word embeddings for each stored document;
receiving, by the at least one processor, a search query from a computing device associated with a user;
  wherein the search query comprises an input document having text;
generating, by the at least one processor, a plurality of input document word embeddings within the input document;
  wherein the plurality of input document word embeddings comprise a plurality of vector representations of a plurality of words in the text of the input document;
determining, by the at least one processor, an average input document word embedding vector for the plurality of input document word embeddings for the input document;
utilizing, by the at least one processor, the similarity model to determine an input document similarity metric of an input document similarity between the input document and each stored document in the set of stored documents based at least in part on the average input document word embedding vector and the refined average stored document word embedding vector of each stored document; and instructing, by the at least one processor, the computing device to display a ranked list of stored documents in response to the search query.

2. The method of claim 1, wherein the similarity model comprises a cosine similarity determination.

3. The method of claim 1, further comprising:
utilizing, by the at least one processor, a word vectorization model to generate the plurality of input document word embeddings for the input document;
receiving, by the at least one processor, a user selection confirming or denying the similarity metric of at least one stored document in the ranked list of stored documents;
determining, by the at least one processor, a similarity error based at least in part on a difference according to an optimization function between:
  i) the user selection confirming or denying the similarity metric of the at least one stored document in the ranked list of stored documents, and
  ii) a ranked position of the at least one stored document within the ranked list of the stored documents; and
training, by the at least one processor, parameters of the word vectorization model based at least in part on the similarity error.

4. The method of claim 1, further comprising:
receiving, by the at least one processor, a user selection confirming or denying the similarity metric of at least one stored document in the ranked list of stored documents;
determining, by the at least one processor, a similarity error based at least in part on a difference according to an optimization function between:
  i) the user selection confirming or denying the similarity metric of the at least one stored document in the ranked list of stored documents, and
  ii) a ranked position of the at least one stored document within the ranked list of the stored documents; and
training, by the at least one processor, parameters of the similarity model based at least in part on the similarity error.

5. The method of claim 1, wherein the similarity model comprises an optimization objective to maximize the similarity metric between the input document and the set of stored documents.

6. The method of claim 5, wherein the similarity model comprises at least one clustering model.

7. The method of claim 1, further comprising:
generating, by the at least one processor, a k-d tree of the set of stored documents; and
determining, by the at least one processor, the ranked list of stored documents by using the similarity model to traverse the k-d tree.

8. The method of claim 1, further comprising:
receiving, by at least one processor, a new document having new text;
generating, by the at least one processor, a plurality of new word embeddings for the new document;
determining, by the at least one processor, a new average word embedding vector of the plurality of new word embeddings for the new document; and
storing, by the at least one processor, the new document in the set of stored documents;
wherein storing the new document in the set of stored documents comprises adding the new average word embedding vector to a cache of the stored average word embedding associated with the stored text of each stored document.

9. The method of claim 1, wherein the average of the plurality of input document word embeddings comprises a weighted average based at least in part on a section of the text in which each word is located.

10. The method of claim 1, further comprising:
generating, by the at least one processor, a similarity alert based at least in part on the similarity metric of the input document to at least one stored document in the set of stored documents exceeding a predetermined similarity threshold; and
causing, by the at least one processor, the computing device to produce the similarity alert to the user to alert the user of the at least one stored document.

11. The method of claim 1, wherein the input document comprises a regulatory requirement document and the set of stored documents comprises a set of business controls documents.

12. The method of claim 1, further comprising instructing at least one activity execution device, by the at least one processor, to execute at least one activity associated with the input document according to a highest ranked stored document in the ranked list of stored documents.

13. A system comprising:
at least one processor configured to execute software instructions that cause the at least one processor to perform steps to:
  access a training set of stored documents;
    wherein the training set of stored documents comprise:
      at least one existing pair of stored documents representing at least one pair of stored documents that are similar to each other, and
      at least one non-existing pair of stored documents representing at least one pair of stored documents that are not similar to each other:
  generate a plurality of initial stored document word embeddings within each stored document of the set of stored documents;
    wherein the plurality of initial stored document word embeddings comprise a plurality of stored document vector representations of a plurality of words in text of each stored document;
  determine an average stored document word embedding vector for the plurality of initial stored document word embeddings for each stored document;
  utilize a similarity model to determine a similarity metric of a similarity between a first stored document and a second stored document of each candidate pair of a plurality of candidate pairs of stored documents in the set of stored documents based at least in part on the average stored document word embedding vector of each of the first stored document and the second stored document;
  generate a plurality of refined stored document word embeddings for each stored document in the set of stored documents by backpropagating an error of the similarity metric of each candidate pair, wherein the error is based at least in part on the at least one existing pair and the at least one non-existing pair;

generate a refined average stored document word embedding vector for the plurality of refined stored document word embeddings for each stored document;

receive a search query from a computing device associated with a user;
  wherein the search query comprises an input document having text;

generate a plurality of input document word embeddings within the input document;
  wherein the plurality of input document word embeddings comprise vector representations of a plurality of words in the text of the input document;

determine an average input document work embedding vector for the plurality of input document word embeddings for the input document;

utilize the similarity model to determine an input document similarity metric of an input document similarity between the input document and each stored document in the set of stored documents based at least in part on the average input document word embedding vector and the refined average stored document word embedding vector of each stored document; and instruct the computing device to display a ranked list of stored documents in response to the search query.

14. The system of claim 13, wherein the input document comprises a regulatory requirement document and the set of stored documents comprises a set of business controls documents.

15. The system of claim 13, wherein the at least one processor is further configured to execute software instructions that cause the at least one processor to perform steps to instruct at least one activity execution device to execute at least one activity associated with the input document according to a highest ranked stored document in the ranked list of stored documents.

16. The system of claim 13, wherein the at least one processor is further configured to execute software instructions that cause the at least one processor to perform steps to:
  utilize a word vectorization model to generate the plurality of input document word embeddings for the input document;

receive a user selection confirming or denying the similarity metric of at least one stored document in the ranked list of stored documents;

determine similarity error based at least in part on a difference according to an optimization function between:
    i) the user selection confirming or denying the similarity metric of the at least one stored document in the ranked list of stored documents, and
    ii) a ranked position of the at least one stored document within the ranked list of the stored documents; and train parameters of the word vectorization model based at least in part on the similarity error.

17. The system of claim 13, wherein the similarity model comprises an optimization objective to maximize the similarity metric between the input document and the set of stored documents.

18. The system of claim 17, wherein the similarity model comprises at least one clustering model based on a cosine similarity determination.

19. The system of claim 13, wherein the at least one processor is further configured to execute software instructions that cause the at least one processor to perform steps to:
  generate a k-d tree of the set of stored documents; and
  determine the ranked list of stored documents by using the similarity model to traverse the k-d tree.

20. The system of claim 13, wherein the at least one processor is further configured to execute software instructions that cause the at least one processor to perform steps to:
  receive a new document having new text;
  generate a plurality of new word embeddings for the new document;
  determine new average word embedding vector of the plurality of new word embeddings for the new document; and
  store the new document in the set of stored documents;
    wherein storing the new document in the set of stored documents comprises adding the new average word embedding vector to a cache of the stored average word embedding associated with the stored text of each stored document.

* * * * *